Patented Aug. 22, 1944

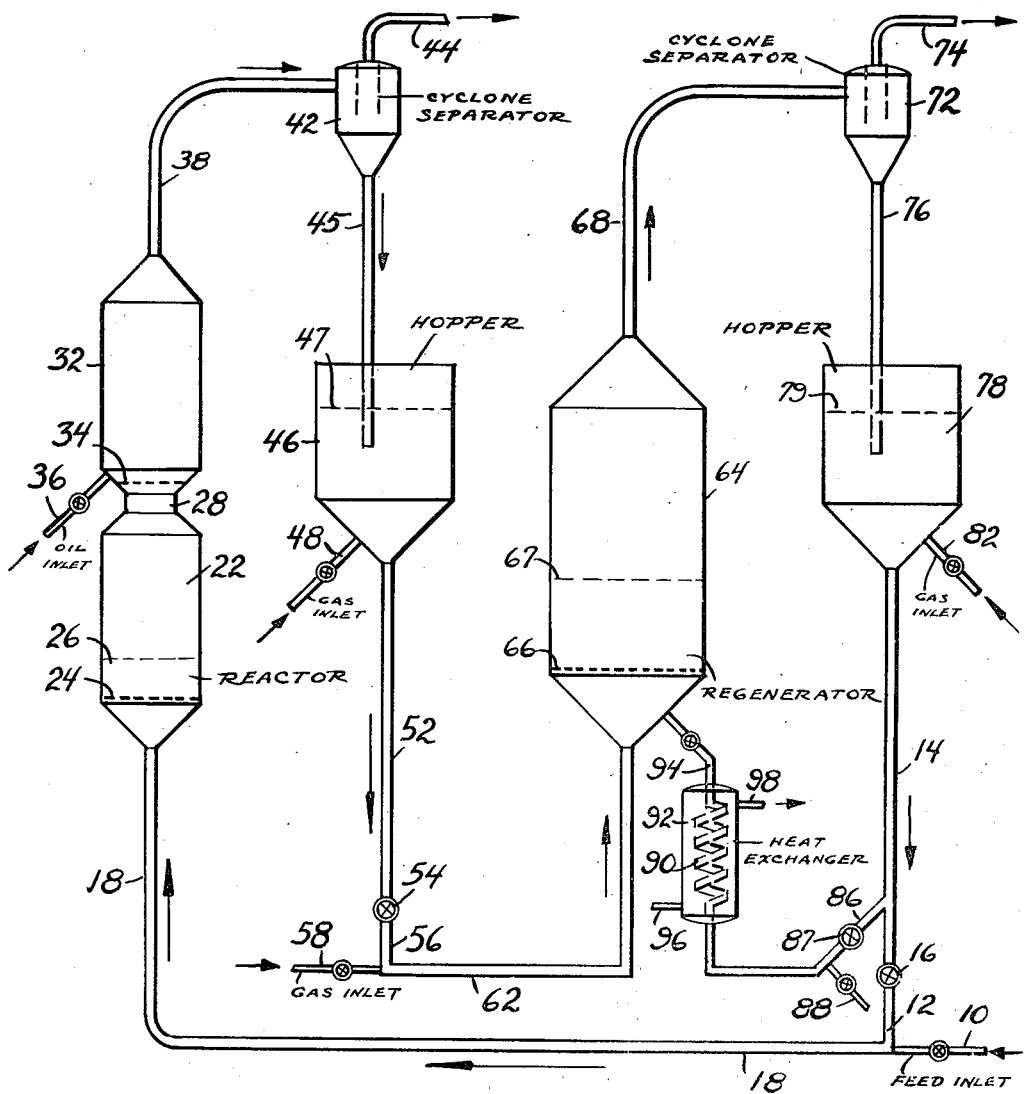

2,356,697

UNITED STATES PATENT OFFICE 2,356,697

TREATING HYDROCARBON FLUIDS

George A. Rial, Linden, N. J., assignor to Standard Oil Development Company, a corporation of Delaware Application December 27, 1941, Serial No. 424,608

4 Claims. (Cl. 196—52)

This invention relates to catalytic conversion of hydrocarbons and more particularly relates to the catalytic conversions of hydrocarbons where carbonaceous material is deposited on the catalyst particles and the catalyst is regenerated for reuse in additional conversion operations.

In the catalytic conversion of hydrocarbons using powdered or finely divided catalysts, hydrocarbon vapors or gases are mixed with the catalyst particles at a conversion temperature and passed through a reaction zone. During the conversion, carbonaceous material is deposited on the catalyst particles and the activity of the catalyst is reduced.

The spent or partially spent catalyst particles are regenerated by burning with air or a suitable gas containing oxygen to burn off the carbonaceous material. The regenerated catalyst is then returned to the reaction zone and is used in another conversion operation. In some conversions the amount of carbonaceous material deposited on the catalyst is insufficient to heat the regenerated catalyst to the desired temperature or is insufficient to maintain the desired temperature during regeneration. Some hydrocarbon stocks form less carbonaceous material on the catalyst during conversion than others and the amount of heat generated during regeneration of the catalyst will vary.

My invention overcomes the above objections by adding carbonaceous material to the catalyst particles to be regenerated so that the amount of heat supplied on regeneration of the spent or partially spent catalyst will remain substantially constant for a given unit. Broadly my invention relates to adding carbonaceous material as a deposit to the catalyst particles going to the regeneration zone to make up for any deficiency of carbonaceous material deposits during the catalytic conversion of the hydrocarbons.

More specifically, my invention relates to adding hydrocarbon material to the catalyst particles and reaction products leaving a butane or butene dehydrogenation zone to quench the reaction products and to increase the carbonaceous material on the catalyst particles. In conversions of this type insufficient carbonaceous material is deposited on the catalyst particles to maintain the desired temperature during regeneration. During quenching, the introduced hydrocarbon material is partly converted by catalytic cracking to lighter hydrocarbon products and partly into carbonaceous material deposited on the catalyst particles. In other conversions where insufficient amounts of carbonaceous material are deposited on the catalyst particles, hydrocarbon material may be added as just described to add carbonaceous material to the catalyst particles before regenerating the catalyst particles.

In the drawing the figure diagrammatically represents one form of apparatus adapted to carry out my invention but it is to be understood that other forms of apparatus may be used.

Referring now to the drawing, the reference character 10 designates a line for feeding hydrocarbon vapors or gases into a line 12 containing catalyst particles in finely divided form. Preferably, the oil is introduced into line 12 as a plurality of streams to obtain better mixing. The finely divided catalyst or powdered catalyst comprising hot regenerated catalyst is introduced into line 12 extending from a standpipe 14 later to be described in greater detail. The standpipe at its lower end is provided with a valve 16 for controlling the amount of catalyst introduced into line 12 for admixture with the hydrocarbon feed. Preferably, the catalyst particles in the standpipe 14 are maintained in a fluidized or aerated condition so that they flow like a liquid and in addition develop a head of pressure similar to a hydrostatic head for delivering the catalyst particles to the line 12.

The catalyst particles and the hydrocarbon feed are at a reaction temperature and the suspension of catalyst particles in the hydrocarbon vapors or gases is passed through line 18 and introduced into the bottom portion of a reaction zone or vessel 22. The reaction vessel 22 is provided with a distribution plate 24 for causing intimate mixing of the catalyst particles and hydrocarbon vapors or gases as they pass through the plate. The diameter of the reaction vessel 22 is much greater than the diameter of the inlet line 18 and due to the difference in cross-sectional area there is a reduction in velocity of the vapors or gases passing into the reaction vessel 22. Due to this reduction in velocity there is an increase in the concentration of catalyst particles in the reaction zone 22 above that existing in the inlet pipe 18 so that a relatively dense phase is formed having a level 26. The catalyst particles and hydrocarbon vapors or gases are maintained in turbulent condition while they are in the reaction vessel and in this way substantially uniform temperatures are maintained in the reaction zone.

While there is an increase in the concentration of catalyst particles in the reaction zone and the catalyst particles tend to settle, the hydrocarbon vapors or gases are under sufficient velocity to prevent the catalyst particles from settling out on the distribution plate 24 in the reaction zone. The velocity of the vapors or gases may be maintained at any desired figure to provide a level of the dense phase at different heights in the reaction vessel 22.

In carrying out a conversion such as butane or butene dehydrogenation the reaction is at a relatively high temperature and of short duration. In these reactions insufficient carbonaceous material is deposited on the catalyst particles to bring the catalyst particles to the desired temperature during regeneration. In order to quench the reaction and to introduce additional carbonaceous material on the catalyst particles, the reaction products and catalyst particles from the reaction vessel 22 are passed upwardly through the restricted opening 28 and then into another vessel 32 arranged above the reaction vessel 22. The vessel 32 is also provided with a distribution plate 34 to provide a mixing device for the catalyst particles and reaction products.

Normally liquid hydrocarbons such as residual oils, heavy oils, gas oil, or the like, are introduced into the bottom portion of the vessel 32 by means of line 36. The normally liquid hydrocarbons are preferably at a lower temperature than the reaction products so as to reduce the temperature of the reaction products below reaction temperature. In vessel 32 the catalyst particles and hydrocarbon vapors or gases are maintained in a turbulent condition so that intimate mixing is obtained with a resulting uniform temperature. During quenching the introduced normally liquid hydrocarbons are catalytically cracked to produce gasoline and other hydrocarbons and additional carbonaceous material which is deposited on the catalyst particles.

The quenched reaction products and the catalyst particles leave the top of the second vessel 32 through line 38 and are introduced into a separating means 42 for separating solid catalyst particles from vaporous reaction products. In the drawing a cyclone separator is shown but other separating means may be used such as bag filters, Cottrell precipitators, etc. While one separating means has been shown in the drawing, it is to be understood that one or more may be used.

In the separating means 42 the vaporous reaction products pass overhead through line 44 and are passed through suitable equipment for separating desired products. The solid catalyst particles are collected in the separating means and are withdrawn therefrom through line 45 and introduced into a hopper 46. Preferably, the pipe or line 45 extends below the surface or level 47 of the spent catalyst particles in the hopper 46.

Preferably a suitable gas such as steam is introduced into the bottom portion of the hopper 46 through line 48 to aerate or fluidize the catalyst particles. The fluidized spent catalyst particles flow into a second standpipe 52 and the height of the standpipe is sufficient to develop a pressure at the bottom of the standpipe for passing the catalyst particles through the regeneration zone presently to be described.

The bottom portion of the standpipe 52 is provided with a valve 54 for controlling the amount of spent catalyst particles leaving the bottom of the standpipe 52. Suitable regenerating gas such as air or oxygen-containing gas is introduced into the line 56 by means of line 58. The mixture of spent catalyst and regenerating gas is passed through line 62 and introduced into the bottom portion of a regenerator or regeneration vessel 64 below the distribution plate 66 therein. The distribution plate 66 is provided to effect adequate mixing of the catalyst particles and regeneration gas. The regeneration vessel 64 has a greater diameter than the inlet line 62 so that the concentration of the catalyst particles in the regenerating gas is greater in the vessel 64 than it is in line 62. The catalyst particles are maintained in a turbulent condition and a substantially constant temperature is maintained during regeneration so that the catalyst particles are not heated to high undesirable temperatures. The velocity of the regenerating gas may be controlled to maintain a level 67 of catalyst particles in the dense phase at any suitable height.

The fluidized catalyst particles in dense phase in the regeneration vessel 64 and the reaction vessel 22 do not have a quiescent level but more nearly approach the appearance of a violently boiling liquid. If desired, the velocities of the gases or vapors introduced into the respective vessels 22 and 64 may be so high that no level of a dense phase is obtained in the vessels.

The regenerated catalyst particles and the gases of regeneration leave the top of the regeneration vessel 64 through line 68 and are introduced into a separating means 72 shown in the drawing as a cyclone separator. More than one separator may be used and other forms of separating means such as bag filters, Cottrell precipitators, etc. may be used. In the separating means 72 gases of regeneration are separated from the regenerated catalyst particles. The gases of regeneration pass overhead through line 74 and the solid regenerated catalyst particles are withdrawn from the bottom of the separating means 72 through line 76 from which they pass into a regenerated catalyst hopper 78.

Preferably the pipe 76 extends below the level 79 of the catalyst particles in the hopper 78. In order to maintain the catalyst particles in fluidized condition a fluidizing gas such as steam may be introduced into the bottom portion of the regenerated catalyst hopper 78 through line 82. From the hopper 78 the regenerated catalyst flows into the standpipe 14 above described for introducing the regenerated catalyst particles into line 12 for admixture with hydrocarbon vapors or gases. The standpipe 14 is of a sufficient length to provide a hydrostatic head of pressure sufficient to move the catalyst particles and hydrocarbon vapors or gases through the reaction vessel 22 into the second vessel 32. As the stream in line 18 is less dense due to the introduction of vapors or gas at 10, the more dense mixture in standpipe 14 causes flow of the catalyst mixture into vessels 22 and 32.

Instead of taking the catalyst particles overhead from reaction zone 22, quenching zone 32 and regeneration zone 64, the catalyst particles may be withdrawn in relatively dense fluidized condition from the bottom portion of these zones. When a quenching zone 32 is used, the relatively dense fluidized catalyst particles may be withdrawn from the bottom portion thereof above distribution plate 34 and passed to hopper 46 or standpipe 52. In some instances where a quenching zone is eliminated, the spent catalyst may be withdrawn in a dense condition from the reaction zone 22 above distribution plate 24.

Likewise, the regenerated catalyst particles may be withdrawn from the body of catalyst particles in the regeneration zone as a dense fluidized stream and passed to standpipe 14 or hopper 78.

In some cases it may be desired to inject additional quantities of a fluidizing gas into the standpipes 14 and 52 to insure fluidizing of the catalyst particles in these standpipes. Branch lines may be provided for introducing fluidizing gas at spaced points along the length of each standpipe.

In some cases as in the regeneration of acid treated clays used for catalytic cracking of hydrocarbons it may be necessary to control the temperature in the regeneration vessel 64 during regeneration. One way of controlling the temperature is by recycling some of the regenerated catalyst particles to the regeneration vessel. A portion of the regenerated catalyst particles is removed from the standpipe 14 through line 86 having a valve 87 and is then mixed with air or other suitable gas introduced through line 88. The mixture is then passed upwardly through a heat exchange coil 90 provided in a heat exchanger 92 wherein the regenerated catalyst particles are cooled to a desired temperature. The cooled regenerated catalyst particles are then introduced into the bottom portion of the regeneration vessel 64 through line 94 for admixture with the spent catalyst undergoing regeneration. The heat exchanger 92 is provided with an inlet 96 and an outlet 98 for the circulation of any suitable heat exchange medium.

Another method of controlling the temperature of the catalyst in the regenerator is by controlling the amount of carbonaceous material injected at the quenching step in vessel 32. The regeneration temperature will be higher when a greater portion of carbonaceous material is injected in the quench zone.

My invention will now be more specifically described in connection with different conversion operations. In the dehydrogenation of butene to butadiene the butene is heated to a temperature of about 1000° F. to 1250° F. and is mixed with a suitable dehydrogenating catalyst at about the same temperature. As a dehydrogenating catalyst, chromium oxide, an oxide of vanadium, tungsten and molybdenum or mixtures thereof may be used. Preferably, the catalyst particles are finely divided and are of a size of about 200 to 400 mesh or finer. Preferably about 8 volumes of steam to 1 volume of butene are used. The time of reaction is from about a fraction of a second to about 25 seconds.

After this short reaction period the catalyst particles and reaction products leave the reaction zone 22 and are quenched with oil introduced into the quenching line 32 through line 36. The quenching oil is at a temperature of about 300° F. and preferably comprises a gas oil. The minimum quench oil temperature will be that temperature which will be required to reduce the oil viscosity so that good atomization and mixing is secured in vessel 32. The maximum oil temperature will be determined by the quantity of heat which is to be removed for a certain carbon deposition on the catalyst. If there is to be no temperature change in vessel 32 the quench oil will be equal to or above the catalyst temperature. The gas oil is cracked during the quenching period and additional amounts of carbonaceous material are deposited on the catalyst particles.

The reaction products are separated from the spent catalyst and regenerating gas is mixed with the spent catalyst. The mixture of spent catalyst and regenerating gas is passed to the regeneration zone where the carbonaceous material is removed by burning. In the dehydrogenation of butene insufficient amounts of carbonaceous material are deposited on the catalyst particles to heat the catalyst particles to a temperature of about 1000° F. to 1250° F. By introducing the quenching oil at 36 sufficient amounts of carbonaceous material are deposited on the catalyst particles to produce a higher temperature during regeneration and to heat the catalyst particles to a temperature of about 1000° F. to 1250° F. In this way the catalyst particles are at the temperature of reaction when mixed with the heated hydrocarbon feed.

After regeneration the catalyst particles in regenerated condition are separated from the gases of regeneration and introduced into a hopper 78 from which they are fed to the standpipe 14.

In the catalytic cracking of hydrocarbons such as gas oil to produce lower boiling hydrocarbons containing gasoline constituents there are some feed stocks which do not deposit enough carbonaceous material on the catalyst particles to provide sufficient heat during regeneration to preheat the feed stock to the desired temperature. In such cases a heavy oil such as residual oil, tar or gas oil is mixed with the products of reaction and catalyst particles leaving the reaction zone 22 by injecting the oil in vessel 32. As the catalyst particles are at a relatively high temperature, there is additional cracking of the introduced heavy oil for producing additional quantities of gasoline hydrocarbons and an additional amount of carbonaceous material which is deposited on the catalyst particles.

In the catalytic cracking of hydrocarbons suitable cracking catalyst such as acid treated bentonite clays, synthetic gels containing silica and alumina or silica and magnesia or other catalysts may be used. Preferably, the catalysts are in finely divided form of a size between 200 and 400 standard mesh or finer. The hydrocarbon oil to be cracked is heated to a temperature of about 850° F. to 1000° F. and is mixed with a cracking catalyst at about the same temperature. During regeneration of a clay type catalyst, temperatures above about 1150° F. should be avoided as the activity of the catalyst particles may be lessened or destroyed. In order to control the temperature during regeneration under these conditions a part of the regenerated catalyst is cooled and recycled to the regeneration zone 64 through line 94. The regenerated catalyst is returned to the regeneration zone at a temperature of about 850° F. to 950° F.

If catalytic cracking is contemplated rather than dehydrogenation, the quenching vessel may be omitted. If the heavy carbonaceous material such as oil which is to be injected can be cracked at the same temperature as the main reaction, it can be injected into the reaction zone 22 and then there is no need for separate zones. The quenching zone or vessel is primarily present to afford two distinctly different temperature zones, the quenching zone being at a much lower temperature than the dehydrogenating zone. However, if the injected oil is to be cracked at a lower or higher temperature than the main reaction it is preferable to provide two different reaction zones.

My invention may also be used for other reactions where carbonaceous material is deposited on the catalyst.

While specific examples of hydrocarbon conversions have been given, it is to be understood that these are by way of example only and various changes and modifications may be made without departing from the spirit of my invention.

I claim:

1. A method for converting hydrocarbons which comprises mixing hydrocarbon vapors with hot regenerated catalyst particles in a fluidized condition, passing the mixture under the hydrostatic pressure of a column of fluidized regenerated catalyst particles into a reaction zone wherein it is maintained under conversion conditions, controlling the flow of reactants so as to maintain a dense fluidized catalyst phase in the reaction zone, withdrawing hot catalyst particles from the reaction zone, contacting the hot catalyst particles outside said reaction zone with a coke-forming relatively heavy hydrocarbon for a time sufficient to crack said heavy hydrocarbon and to increase the deposits of carbonaceous materials on the catalyst particles, fluidizing the spent catalyst particles, mixing the fluidized spent catalyst particles with an oxidizing regenerating gas, passing the mixture under the hydrostatic pressure of a column of fluidized spent catalyst particles into a regenerating zone wherein the carbonaceous materials are burned off the catalyst particles, controlling the flow of catalyst particles and regenerating gas so as to maintain a dense fluidized catalyst phase in the regenerating zone, withdrawing regenerated catalyst particles from the regenerating zone, and feeding hot regenerated catalyst particles into the top of said column of fluidized regenerated catalyst.

2. A method of cracking hydrocarbons which comprises mixing the hydrocarbon vapors to be cracked with hot regenerated catalyst particles in a fluidized condition, passing the mixture under a hydrostatic pressure of a column of fluidized regenerated catalyst particles into a reaction zone wherein it is maintained under cracking conditions, controlling the flow of reactants so as to maintain a dense fluidized catalyst phase in the reaction zone, withdrawing hot catalyst particles from the reaction zone, contacting the hot catalyst particles outside said reaction zone with a coke-forming relatively heavier hydrocarbon for a time sufficient to crack said heavier hydrocarbon and to increase the deposits of carbonaceous materials on the catalyst particles, fluidizing the spent catalyst particles, mixing the fluidized spent catalyst particles with an oxidizing regenerating gas, passing the mixture under the hydrostatic pressure of a column of fluidized spent catalyst particles into a regenerating zone wherein the carbonaceous materials are burned off the catalyst particles, controlling the flow of catalyst particles and regenerating gas so as to maintain a dense fluidized catalyst phase in the regenerating zone, withdrawing regenerated catalyst particles from the regenerating zone, and feeding hot regenerated catalyst particles into the top of said column of fluidized regenerated catalyst particles.

3. A method of dehydrogenating hydrocarbons which comprises mixing the hydrocarbon vapors to be dehydrogenated with hot regenerated catalyst particles in a fluidized condition, passing the mixture under the hydrostatic pressure of a column of fluidized regenerated catalyst particles into a reaction zone wherein it is maintained under dehydrogenating conditions, controlling the flow of reactants so as to maintain a dense fluidized catalyst phase in the reaction zone, withdrawing hot catalyst particles from the reaction zone, contacting the hot catalyst particles outside said reaction zone with a coke-forming relatively heavy hydrocarbon for a time sufficient to crack said heavy hydrocarbon and to increase the deposits of carbonaceous materials on the catalyst particles, fluidizing the spent catalyst particles, mixing the fluidized spent catalyst particles with an oxidizing regenerating gas, passing the mixture under the hydrostatic pressure of a column of fluidized spent catalyst particles into a regenerating zone wherein the carbonaceous materials are burned off the catalyst particles, controlling the flow of catalyst particles and regenerating gas so as to maintain a dense fluidized catalyst phase in the regenerating zone, withdrawing regenerated catalyst particles from the regenerating zone, and feeding hot regenerated catalyst particles into the top of said column of fluidized regenerated catalyst.

4. A method as claimed in claim 1 wherein the catalyst particles are withdrawn in a dense fluidized condition from the bottom portion of the reaction and regenerating zones.

GEORGE A. RIAL.